(12) United States Patent
Poth et al.

(10) Patent No.: US 10,145,249 B2
(45) Date of Patent: Dec. 4, 2018

(54) TURBINE BUCKET LOCKWIRE ANTI-ROTATION DEVICE FOR GAS TURBINE ENGINE

(71) Applicant: Mechanical Dynamics & Analysis LLC, Latham, NY (US)

(72) Inventors: Leissner F. Poth, San Antonio, TX (US); Clayton Danyew, Palm Beach Gardens, FL (US); David Jesse Warren Lovinger, Jupiter, FL (US); Sanjay Surat Hingorani, Johns Creek, GA (US)

(73) Assignee: Mechanical Dynamics & Analysis LLC, Latham, NY (US)

( * ) Notice: Subject to any disclaimer, the term of this patent is extended or adjusted under 35 U.S.C. 154(b) by 371 days.

(21) Appl. No.: 15/067,511

(22) Filed: Mar. 11, 2016

(65) Prior Publication Data

US 2017/0241274 A1    Aug. 24, 2017

Related U.S. Application Data

(60) Provisional application No. 62/298,554, filed on Feb. 23, 2016.

(51) Int. Cl.
*F01D 5/30* (2006.01)
*F01D 5/32* (2006.01)
(Continued)

(52) U.S. Cl.
CPC ............ *F01D 5/3007* (2013.01); *F01D 5/32* (2013.01); *F01D 5/323* (2013.01); *F01D 5/326* (2013.01);
(Continued)

(58) Field of Classification Search
CPC .......... F01D 5/3007; F01D 5/32; F01D 5/326; F01D 5/12; F01D 5/24; F01D 25/04; F01D 2220/32; F01D 2230/60; F01D 2260/30
(Continued)

(56) References Cited

U.S. PATENT DOCUMENTS

| 2,755,062 A | 7/1956 | Hill |
| 2,846,184 A | 8/1958 | Tournere |

(Continued)

FOREIGN PATENT DOCUMENTS

| EP | 2439378 A2 | 4/2012 |
| EP | 2722484 | 4/2014 |
| WO | WO-2015054095 A1 | 4/2015 |

OTHER PUBLICATIONS

"European Application Serial No. 17157723.2, Extended European Search Report dated Jul. 20, 2017", 7 pgs.

(Continued)

*Primary Examiner* — Jason Shanske
*Assistant Examiner* — Jesse Prager
(74) *Attorney, Agent, or Firm* — Burris Law, PLLC

(57) ABSTRACT

A gas turbine engine system comprises a rotor wheel, a plurality of blades, a lockwire and a locking key. The rotor wheel comprises a plurality of axial grooves extending through a periphery of the rotor wheel, and a plurality of posts formed between adjacent slots, each post having a circumferential slot. The blades are mounted in the axial grooves of the rotor wheel, each blade having a circumferential slot circumferentially aligned with the circumferential slots of the posts. The lockwire extends across the plurality of axial grooves of the rotor wheel within each of the circumferential slots of the posts and the blades from a first end to a second end to inhibit axial displacement of the (Continued)

blades within the grooves. The locking key is disposed between the first and second ends of the lockwire and provides support to at least one of the ends of the lockwire to prevent radially inward displacement.

19 Claims, 8 Drawing Sheets

(51) Int. Cl.
    *F01D 25/04*     (2006.01)
    *F01D 5/12*     (2006.01)

(52) U.S. Cl.
    CPC .............. *F01D 25/04* (2013.01); *F01D 5/12* (2013.01); *F05D 2220/32* (2013.01); *F05D 2230/60* (2013.01); *F05D 2260/30* (2013.01); *F05D 2260/36* (2013.01); *Y02T 50/673* (2013.01)

(58) Field of Classification Search
    USPC ............................................ 416/220 R, 221
    See application file for complete search history.

(56) References Cited

U.S. PATENT DOCUMENTS

| | | |
|---|---|---|
| 3,023,998 A | 3/1962 | Sanderson |
| 3,137,478 A | 6/1964 | Farrell |
| 3,341,174 A | 9/1967 | Manning |
| 3,814,539 A | 6/1974 | Klompas |
| 3,841,794 A | 10/1974 | Bergmann |
| 4,171,930 A | 10/1979 | Brisken et al. |
| 4,349,318 A | 9/1982 | Libertini et al. |
| 4,676,723 A | 6/1987 | Kiger et al. |
| 4,767,276 A | 8/1988 | Barnes et al. |
| 5,320,492 A | 6/1994 | Bouru et al. |
| 6,082,970 A * | 7/2000 | Tsukamoto ............... F01D 5/24 |
| | | 416/190 |
| 6,234,756 B1 | 5/2001 | Ress, Jr. et al. |
| 7,290,988 B2 * | 11/2007 | Boston ................. F01D 5/3015 |
| | | 416/220 R |
| 8,485,784 B2 | 7/2013 | Eastman et al. |
| 8,585,369 B2 | 11/2013 | Aubin et al. |
| 8,905,717 B2 | 12/2014 | Roman-Morales et al. |
| 2011/0014053 A1 | 1/2011 | Eastman et al. |
| 2012/0087798 A1 | 4/2012 | Roman-Morales et al. |
| 2012/0244004 A1 | 9/2012 | Virkler |
| 2013/0323052 A1 | 12/2013 | Zhang et al. |
| 2014/0112793 A1 | 4/2014 | Latimer et al. |

OTHER PUBLICATIONS

"European Application Serial No. 17157723.2, Communication Pursuant to EPC Rule 69 dated Sep. 4, 2017", 2 pgs.

* cited by examiner

TURBINE BUCKET LOCKWIRE ANTI-ROTATION DEVICE FOR GAS TURBINE ENGINE

PRIORITY APPLICATIONS

This application claims the benefit of priority to U.S. Provisional Patent Application Ser. No. 62/298,554, filed Feb. 23, 2016, the content of which is hereby incorporated by reference in its entirety.

TECHNICAL FIELD

The present application pertains generally, but not by way of limitation, to gas turbine engines. More particularly, the present application is directed to devices and systems for axially retaining blades in slots of rotor disks or wheels.

BACKGROUND

Gas turbine engines operate by passing a volume of gases through a series of compressors and turbines in order to produce rotational shaft power. High energy gases rotate a high pressure turbine to generate the shaft power. The shaft power drives a high pressure compressor to provide compressed air to a combustion process that generates the high energy gases for turning the high pressure turbine. The high energy gases can also be used to rotate another turbine for additional purposes. In an aircraft engine, a low pressure turbine can be used to generate propulsion, such as directly via thrust, or indirectly via a shaft and fan or propeller. In an industrial gas turbine, a power turbine can be used to drive a shaft for powering a generator that produces electricity.

Each compressor and turbine comprises a plurality of stages of vanes and blades, each vane and blade including an airfoil. In general, stators redirect the trajectory of the air coming off the blades for flow into the next stage. In the compressor, stators convert kinetic energy of moving air into pressure, while, in the turbine, stators accelerate pressurized air to extract kinetic energy. In the compressor, the rotating blades push air past the stationary vanes. In the turbine, the rotating blades extract rotational power from the flowing air.

Typically, blades used in turbines and compressors are removable from the rotor wheel in order to perform maintenance or replace the blades. Thus, various solutions have been implemented to prevent displacement of the blades within the rotor wheel. In one system, a lockwire is disposed near the outer circumference of the rotor wheel to block axial movement of roots of the blades. These designs, however, can experience issues related to circumferential motion of the lockwire. This can, in some instances, compromise retention of the lockwire, potentially allowing axial liberation of the blades. For example, one or more ends of the lockwire can become radially displaced as the lockwire circumferentially rotates, thereby causing ends of the lockwire to be pushed radially inward of the blade roots. Thus, the blades can become unrestrained in the axial direction and can become displaced.

Several attempts have been made to address circumferential displacement of lockwires. U.S. Pat. No. 8,905,717 to Roman-Morales et al. proposes to solve this problem via attachment of tabs onto the lockwire that will restrict lockwire circumferential motion via interference with radial retention features, such as pins, connected to the rotor wheel. U.S. Pub. No. 2014/0112793 to Latimer et al. introduces circumferential stops between ends of the lockwire to prevent circumferential motion the lockwire. U.S. Pat. No. 8,485,784 to Eastman et al. discloses other approaches for restricting circumferential motion via attachment of pins to the lockwire.

OVERVIEW

The present inventors have recognized, among other things, potential shortcomings of previous attempted solutions to the problem of circumferential lockwire rotation. For example, the attachment of welded tabs or pins to the lockwire can add significant manufacturing complexity to the wire. Additionally, such features may become detached in operation, providing cause for potential foreign object damage in operation.

The present inventors have also recognized that a problem to be solved with lockwires includes the tendency for lockwires to circumferentially rotate, which can then cause radial displacement of ends of the lockwire, even with some of the aforementioned attempted solutions. For example, providing stops that only limit circumferential motion of the lockwire fail to inhibit radial motion of the lockwire and are therefore potentially susceptible to the lockwire slipping under the circumferential stop.

Furthermore, the present inventors have recognized that problems associated with circumferential and radial displacement of lockwires can become exacerbated by thermal or mechanical growth of the lockwire, which can cause free ends of the lockwire to grow apart and increase their chances of slipping under a circumferential stop or retention pins within the engine.

The subject matter of the present disclosure can help provide solutions to these and other problems, such as by providing a locking key that radially supports ends of the lockwire over a range of distances between ends of the lockwire caused by temperature and mechanical variations within the engine during operation, in addition to providing a circumferential rotational stop.

In one example, a gas turbine engine system comprises a rotor wheel, a plurality of blades, a lockwire and a locking key. The rotor wheel comprises a plurality of axial grooves extending through a periphery of the rotor wheel, and a plurality of posts formed between adjacent slots, each post having a circumferential slot. The plurality of blades are mounted in the plurality of axial grooves of the rotor wheel, and each blade has a circumferential slot circumferentially aligned with the circumferential slots of the plurality of posts. The lockwire extends across the plurality of axial grooves of the rotor wheel within each of the circumferential slots of the posts and blades from a first end to a second end to inhibit axial displacement of the plurality of blades within the plurality of grooves. The locking key is disposed between the first and second ends of the lockwire to provide support to at least one of the ends of the lockwire and prevent at least one end from being displaced radially inward.

The locking key can be comprised of a central portion positioned between the ends of the lockwire. The central portion links the locking key to the rotor wheel, with first and second arms extending laterally outward from the central portion to restrict radial inward displacement of the first and second ends of the lockwire.

This overview is intended to provide an overview of subject matter of the present patent application. It is not intended to provide an exclusive or exhaustive explanation of the invention. The detailed description is included to provide further information about the present patent application.

Figure 1:
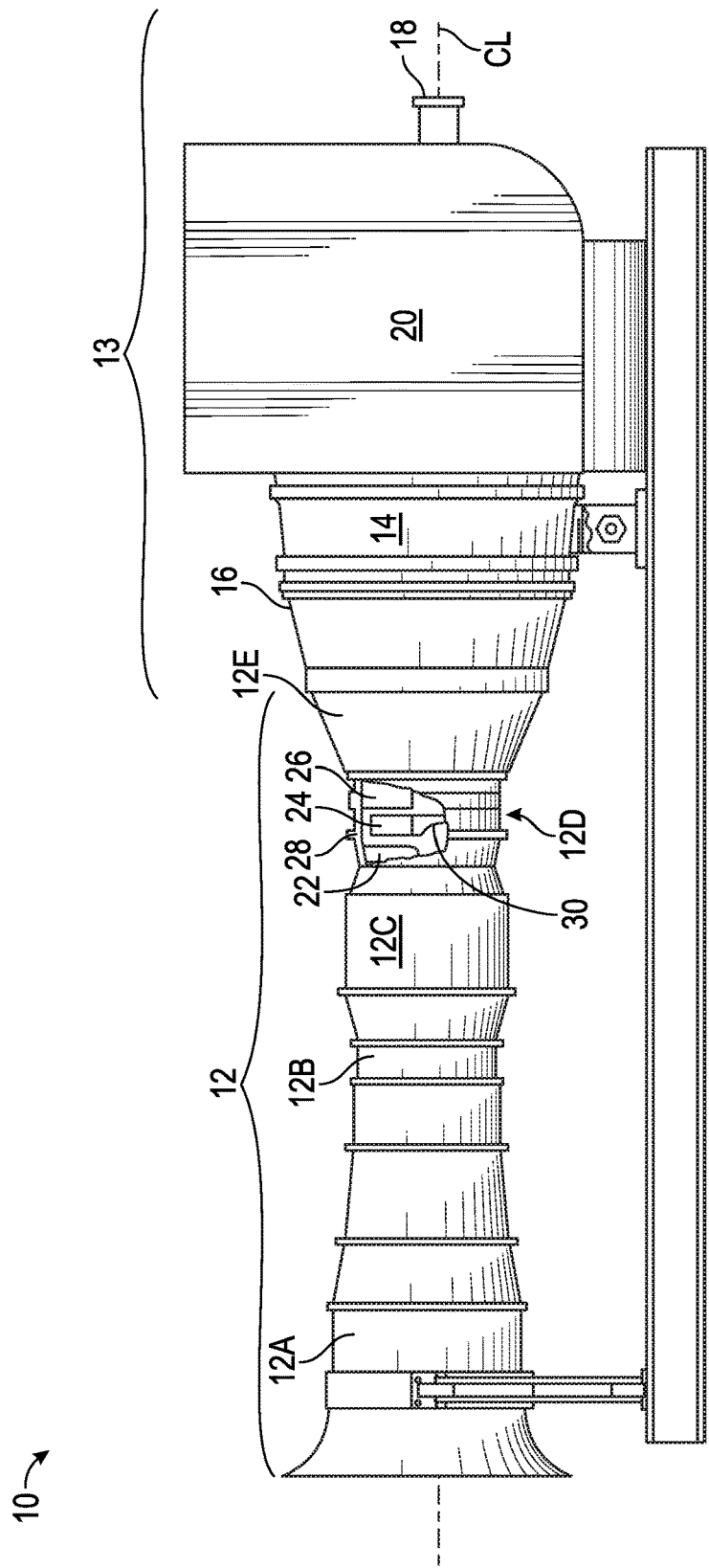
FIG. 1 is a partially broken away side view of an industrial gas turbine engine showing a portion of a turbine section of a gas generator disposed between a combustor section and a power generator.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a partially broken away side view of gas turbine engine 10 showing gas generator 12 connected to power generator 13 via power turbine inlet (PTI) 16. In the illustrated embodiment, gas turbine engine 10 is an industrial gas turbine engine circumferentially disposed about a central, longitudinal axis or axial engine centerline CL. Gas generator 12 includes, in series order from front to rear, low pressure compressor section 12A, high pressure compressor section 12B, combustor section 12C, high pressure turbine section 12D, and low pressure turbine section 12E. Power generator 13 comprises PTI 16, power turbine 14, which is disposed aft of low pressure turbine section 12E, output shaft 18 and exhaust duct 20. Rotation of power turbine 14 drives output shaft 18, which may be coupled to an electrical generator (not shown) that is also part of power generator 13. Gas generated by gas generator 12 passes through power turbine 14 and leaves engine 10 at exhaust duct 20.

As is known in the art of gas turbine engines, incoming ambient air becomes pressurized within low and high pressure compressors sections 12A and 12B. Fuel mixes with the pressurized air in combustor section 12C, where it is burned. Once burned, combustion gases expand through high and low pressure turbine sections 12D and 12E and into PTI 16. From PTI 16, the combustion gases flow into power turbine 14. High and low pressure turbine sections 12D and 12E drive high and low pressure rotor shafts, respectively, within engine 10 that rotate in response to the flow of the combustion gases thereby rotating the attached high and low pressure compressor sections 12B and 12A, respectively. Although FIG. 1 is described with reference to high and low pressure spools, the present disclosure may be used with single spool engines having only a single compressor stage and a single turbine stage.

Power turbine 14 may, for example, drive an electrical generator, pump, or gearbox (not shown). It is understood that FIG. 1 provides a basic understanding and overview of the various sections and the basic operation of an industrial gas turbine engine. It will become apparent to those skilled in the art that the present application is applicable to all types of gas turbine engines, including those with aerospace or aircraft applications. Similarly, although the present disclosure is described with reference to turbine blades, the present invention is applicable to other components of gas turbine engines, such as compressor blades, fan blades and the like.

High pressure turbine section 12D comprises first stage vane 22, first stage turbine blade 24 and second stage vane 26. First stage vane 22 and second stage vane 26 are joined to engine case 28 at their radially outer ends. First stage turbine blade 24 is connected to first stage rotor wheel 30 at its radially inner end. The present disclosure is directed towards features for retaining turbine blade 24 within its attachment to rotor wheel 30.

Figure 2A:
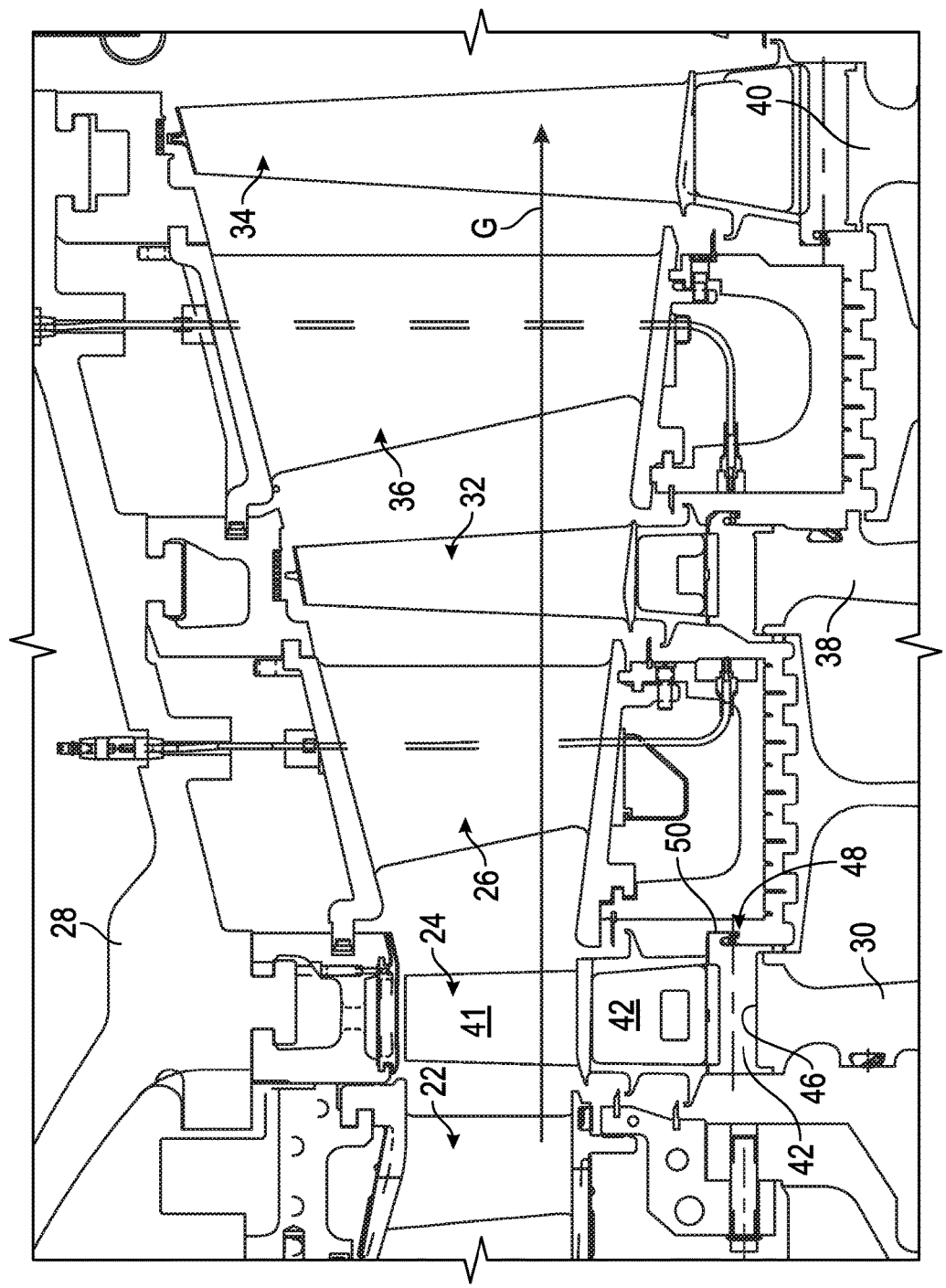
FIG. 2A is a schematic side view of the turbine section used in the gas generator of the industrial gas turbine engine of FIG. 1 showing a plurality of stages of turbine blades and vanes.

FIG. 2A is a schematic side view of high pressure turbine section 12D used in gas generator 12 of industrial gas turbine engine 10 of FIG. 1 showing first stage turbine blade 24, second stage turbine blade 32, third stage turbine blade 34, first stage vane 22, second stage vane 26 and third stage vane 36. Vanes 22, 26 and 36 are suspended from engine case 28, while blades 24, 32 and 34 extend from rotor wheels 30, 38 and 40, respectively. High energy gas produced by combustor section 12C flows along gas path G in an axial direction, which extends sequentially past vanes 22, 26 and 36 and blades 24, 32 and 34. Gas turbine engine 10 may include additional stages of blades (also known as buckets) and vanes (also known as nozzles), such as in low pressure turbine section 12E, that can incorporate the features of the present disclosure, but are not described for brevity. While an embodiment of the engine has been described having low and high pressure turbine sections with connection to a generator via a power turbine, it will be appreciated that the scope of the disclosure is not so limited, and may apply to other arrangements, such as to have a single turbine section, and connection to a generator, via the compressor shaft, for example.

Blades 24, 32 and 34 rotate at high speed on wheels 30, 38 and 40 and are therefore subject to radial loading. Additionally, blades 24, 32 and 34 are subject to axial loading from the high energy gases flowing through engine 10. It is desirable to maintain blades 24, 32 and 34 secured to wheels 30, 38 and 40 in order to, among other things, prevent damage to surrounding components, such as vanes 22, 26 and 36. Radial retention of blades can be provided by a blade root and wheel slot interface, while axial retention of blades can be provided by a lockwire. For example, first stage blade 24 includes a shank 41, from which airfoil 44 extends.

Figure 2B:
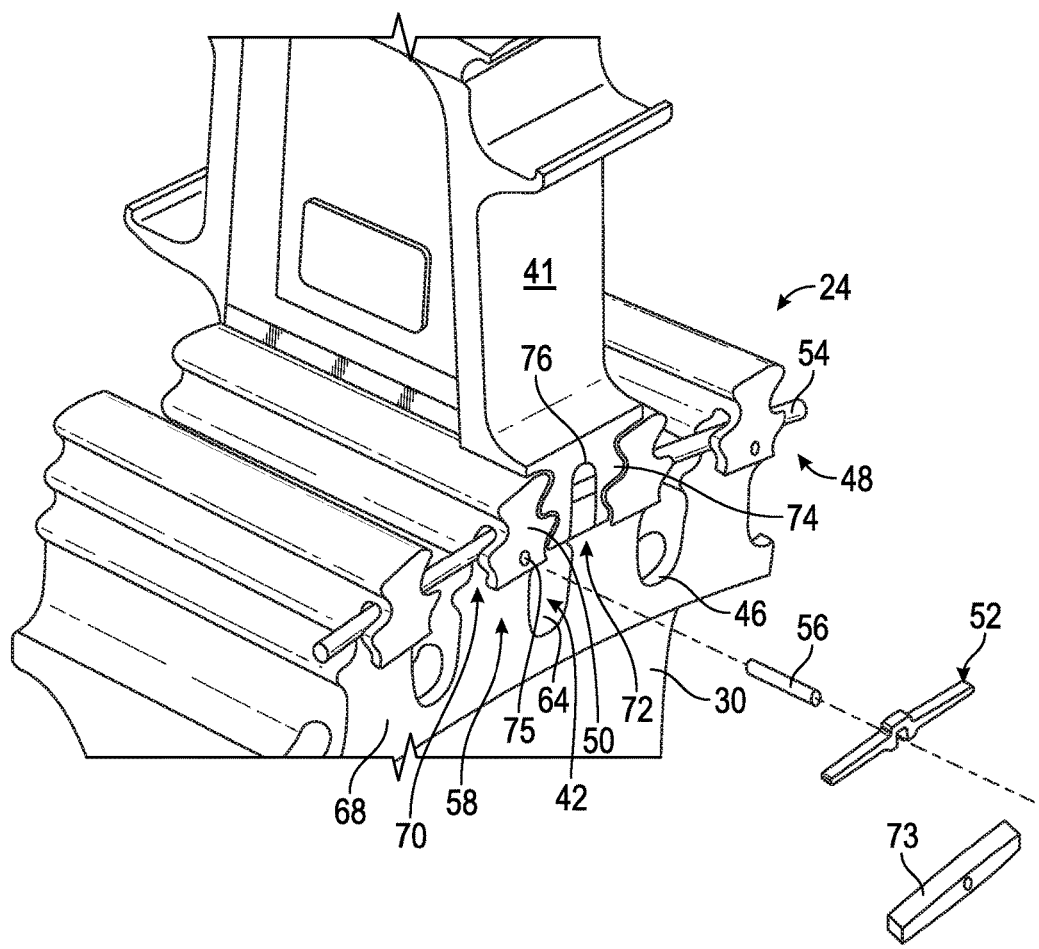
FIG. 2B is a rear perspective view of the first stage of the turbine section of FIG. 2A showing a locking key exploded from a rotor wheel having a plurality of slots and a turbine blade root connected to one of the slots with a lockwire disposed to retain the blade root within the slot.

FIG. 2B is a rear perspective view of an exemplary first stage of turbine section 12D of FIG. 2A. With reference to FIGS. 2A and 2B, a blade root 42 is attached to the shank 41 and is axially inserted into slot or groove 46 of wheel 30. Conventional fir tree or dovetail engagements can be used to prevent radial displacement of root 42 from groove 46. Blade root 42 and groove 46 may include features that, together with a lockwire, form retention mechanism 48 for axially restraining blade 24 within wheel 30. In particular, blade root 42 includes hook 74, which forms a circumferential slot into which the lockwire can be disposed.

Hook 74 is shown extending from an aft surface of blade root 42. However, lockwires and locking keys of the present disclosure can also be used on forward areas of blades and wheels, (as shown in FIG. 2A) for the third stage blade 34. Likewise, although the lockwires and locking keys of the present disclosure are discussed with reference to a turbine section, they may also be used in compressor sections of gas turbine engines.

Figure 3:
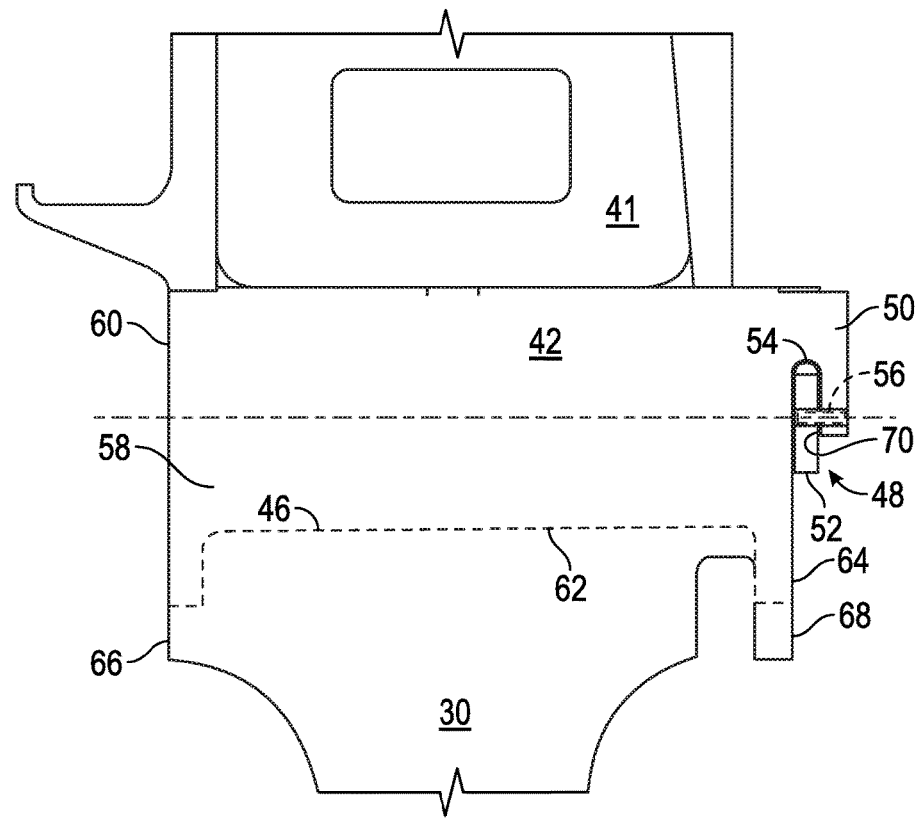
FIG. 3 is a close-up view of a first stage turbine blade of the turbine section of FIG. 2A disposed in a slot of a rotor wheel with a locking key disposed to retain the lockwire and a retention pin disposed to retain the locking key.

FIG. 3 is a close-up view of first stage turbine blade 24 of turbine section 12D of FIG. 2A disposed behind post 58, in groove 46 of rotor wheel 30 with locking key 52 disposed to retain lockwire 54 and retention pin 56 disposed to retain locking key 52. Blade root 42 includes inner surface 62 disposed between forward surface 60, and aft surface 64, which are shown behind forward surface 66, groove 46 and aft surface 68 of post 58.

Blade 24 is connected to rotor wheel 30 such that inner surface 62 of root 42 contacts or interfaces with groove 46. On an exemplary first stage turbine blade 24, hook 74 extends axially rearward from aft surface 64 and radially inward to form circumferential slot 72. As can be seen in FIG. 2B, circumferential slot 72 of the blade 24 aligns with circumferential slots 70 in the post 58.

As shown in FIG. 2B, locking key 52 is exploded from rotor wheel 30. Turbine blade root 42 is connected to and retained within one of a plurality grooves 46 within rotor wheel 30 via lockwire 54. Counter-weight key 73 can also be attached to rotor wheel 30 to provide rotational balance. Blade root 42 includes hook 74, which extends axially rearward and inward from aft surface 64 to form circumferential slot 72. Hook 50 extends axially rearward from aft surface 68 and readily inward to form circumferential slot 70.

Circumferential slot 72 of blade root 42 aligns with circumferential slots 70 of posts 58. As such, lockwire 54 can be threaded through slots 70 and 72 to substantially surround or circumscribe rotor wheel 30 near an outer circumference or perimeter of rotor wheel 30. Lockwire 54 is, however, located within the outer periphery of rotor wheel 30 so as to extend across grooves 46 to restrain blade roots 42. Locking key 52 can be positioned within one of slots 70 between ends of lockwire 54. Locking key 52 can be retained by pin 56 inserted into bore 75 to prevent displacement of the key 52, and therefore lockwire 54. In other embodiments, other fasteners than a pin can be used to link locking key 52 to rotor wheel 30, such as screws, bolts and the like. Counter-weight key 73 can be disposed in engine 10 opposite locking key 52 on rotor wheel 30 to offset any rotational imbalance produced by locking key 52. Counter-weight key 73 can be attached using a pin in a substantially similar manner as locking key 52. However, in various embodiments, locking key 52 has a weight that is small enough to not affect the rotation of rotor wheel 30 such that counter-weight key 73 can be omitted.

Figure 4A:
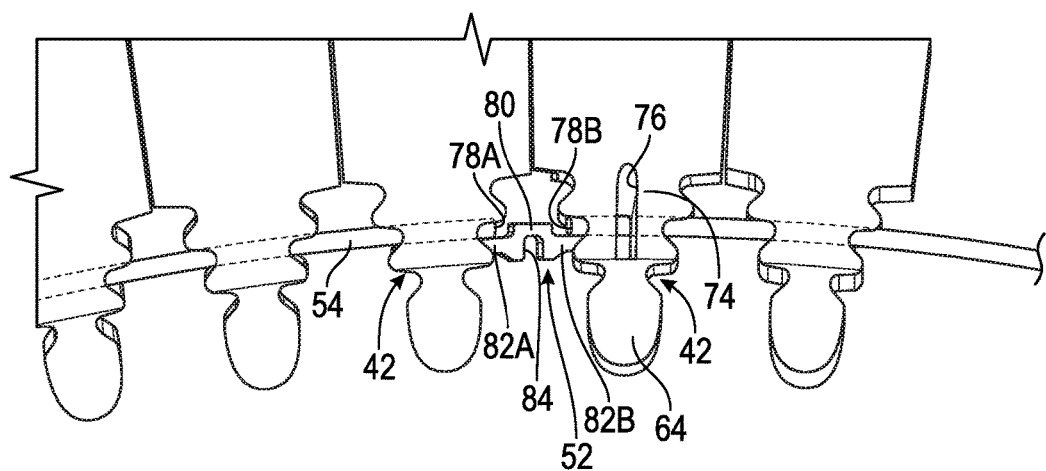
FIG. 4A is a rear end view of the first stage turbine of FIG. 2B showing the locking key disposed between blade roots and ends of the lockwire.
Figure 4B:
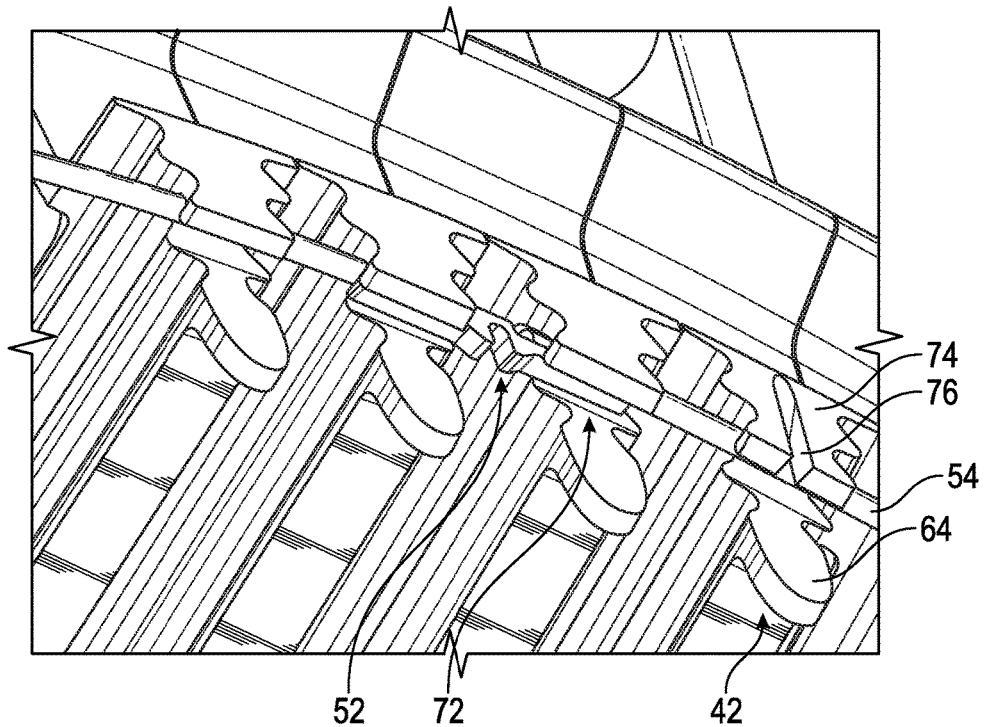
FIG. 4B is a bottom perspective view of the first stage turbine of FIG. 2B showing the locking key disposed between blade roots and ends of the lockwire.

FIG. 4A is a rear end view of the first stage turbine of FIG. 2B showing locking key 52 disposed between blade roots 42 and ends 78A and 78B of lockwire 54. FIG. 4B is a bottom perspective view of the first stage turbine of FIG. 2B showing locking key 52 disposed between blade roots 42 and ends 78A and 78B of lockwire 54.

Blade root 42 may also include slot 76, which extends upward into the inward-most surface of hook 74 across where lockwire 54 is disposed. Slot 76 allows a tool, such as a pick, to be inserted into slot 72 to interface with lockwire 54. For example, the tool can be inserted into slot 72 to bend an end of lockwire 54 inward so as to be accessible outside of slots 70 and 72. Opposing ends 78A, 78B of lockwire 54 are disposed between adjacent blade roots 42.

Locking key 52 includes central portion 80 and arms 82A and 82B. Central portion 80 includes cut-out 84 into which pin 54 can be disposed to retain locking key 52 against post 58 within circumferential slot 70 (FIG. 2B). Central portion 80 extends far enough radially outwardly to be at least partially positioned between ends 78A and 78B of lockwire 54. As such, lockwire 54 is prevented from circumferentially rotating beyond a limited amount allowed by the difference of the gap between ends 78A and 78B and the width of central portion 80. Central portion 80 includes arms 82A and 82B that extend circumferentially from central portion 80 and are positioned underneath ends 78A and 78B, respectively, to prevent radially inward displacement of ends 78A and 78B. The length of each of arms 82A and 82B is greater than the aforementioned limited amount to ensure that ends 78A and 78B cannot slip off of arms 82A and 82B.

Figure 5A:
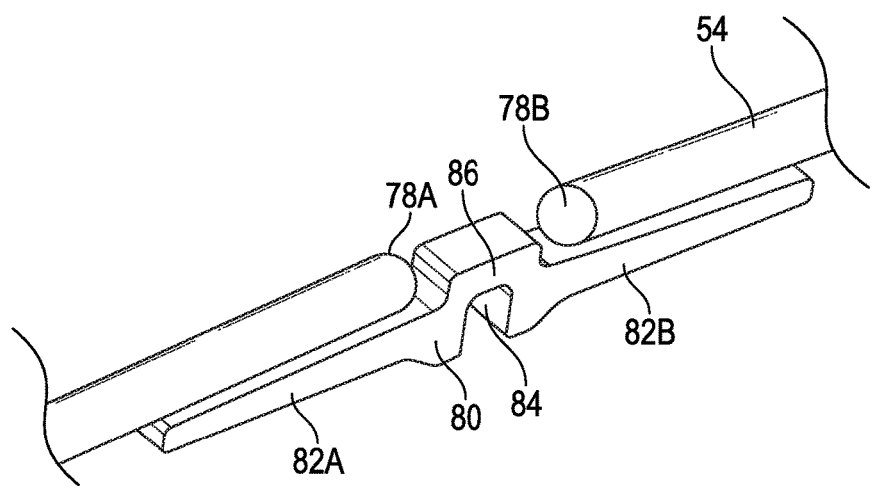
FIG. 5A is a perspective view of a first embodiment of the locking key of FIGS. 3-4B showing the lockwire in a cold position.
Figure 5B:
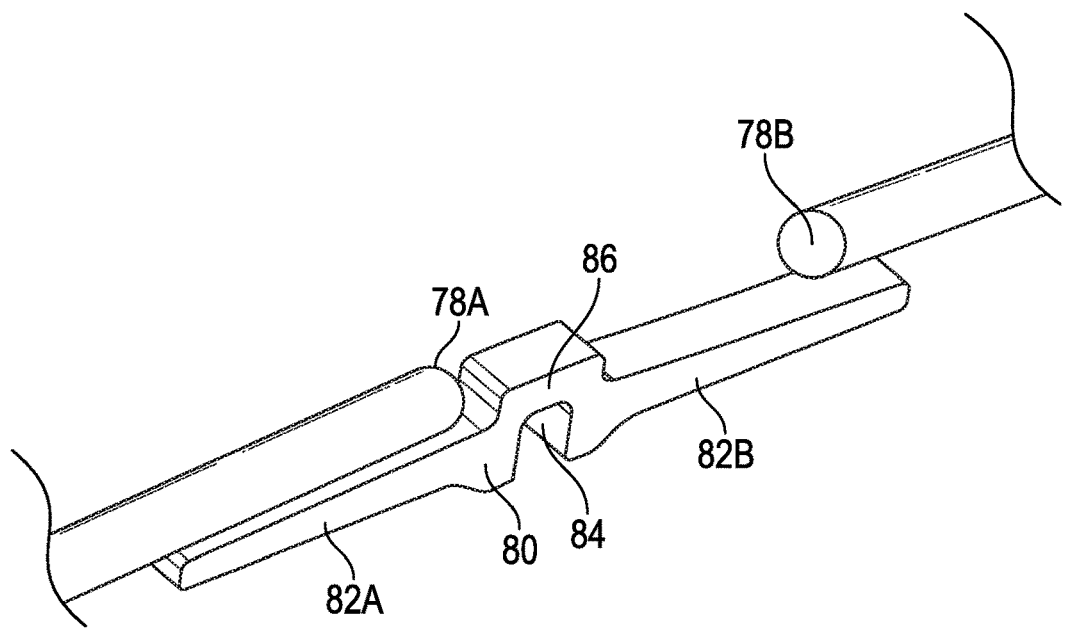
FIG. 5B is a perspective view of the first embodiment of the locking key of FIG. 5A showing the lockwire in a hot position.

As can be seen in FIG. 4B, the thickness of locking key 52 is almost the same size as the width of slots 70 and 72. Locking key 52 is, however, slightly narrower in order to fit with appropriate clearance within hooks 50 and 74, adjacent aft surfaces 64, 68. Locking key 52 is sized so as to freely slide between the aforementioned surfaces under influence from a technician or other service personnel, but is not so loose so as to unduly vibrate FIG. 5A is a perspective view of a first embodiment of locking key 52 of FIGS. 3-4B showing lockwire 54 in a cold position. FIG. 5B is a perspective view of the first embodiment of locking key 52 of FIG. 5A showing lockwire 54 in a hot position.

In a cold state, such as when lockwire 54 and locking key 52 are installed into gas turbine engine 10, ends 78A and 78B are positioned on either side of central portion 80 such as the distances therebetween are random. In one embodiment, ends 78A and 78B abut central portion 80 such that very little or no space is provided between ends 78A and 78B and central portion 80. Generally, lockwire 54 is installed so that ends 78A and 78B are equally spaced from central portion 80. However, central portion 80 need not be centered and lockwire 52 can be installed with any amount of gap between central portion 80 and either of ends 78A and 78B.

Figure 7:
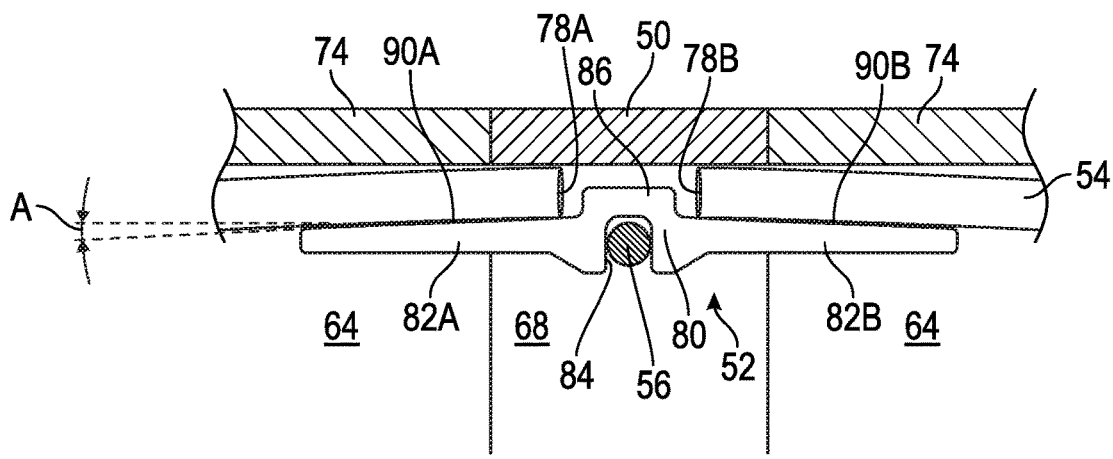
FIG. 7 is a front view of the locking key of FIGS. 5A and 5B showing circumferential curvature of the arms.

In one embodiment, the spaces between upper surfaces of arms 82A and 82B and the underside of hooks 50 and 74 is approximately equal to the diameter of lockwire 54 (as can be seen in FIG. 7) such that lockwire 54 can only be installed with ends 78A and 78B opposite central portion 80.

In a hot state, such as when gas turbine engine 10 comes up to operating temperatures, lockwire 54 is subject to a combination of various stresses and strains, such as from thermal growth and centrifugal force. As such, lockwire 54 can expand such that the overall hoop diameter of lockwire 54 increases. In such a condition, the gap distance between ends 78A and 78B can grow to be greater than in the cold state. As such, arms 82A and 82B need to be long enough to accommodate and continue to radially restrain ends 78A and 78B retreating from central portion 80.

Furthermore, due to centripetal forces from rotation of rotor wheel 30, lockwire 54 can be pushed or urged toward one side of central portion 80. Depending on the rotational direction of turbine section 12D, end 78A of lockwire 54 can be urged toward central portion 80 so as to abut central portion 80, thereby pushing end 78B away from central portion 80. As such, arms 82A and 82B are each long enough to accommodate having the entirety of the gap length between ends 78A and 78B on one side of central portion 80. In one embodiment, locking key 52 can include only one of arms 82A and 82B to support one of ends 78A and 78B. For example, if it is known that end 78B will slide away from central portion 80, while end 78A remains engaged with central portion 80, arm 82A can be omitted from locking key 52. In such an embodiment, the opposite side of central portion 80 facing end 78A can be coated with a friction increasing feature, such as diamond grit.

Figure 6:
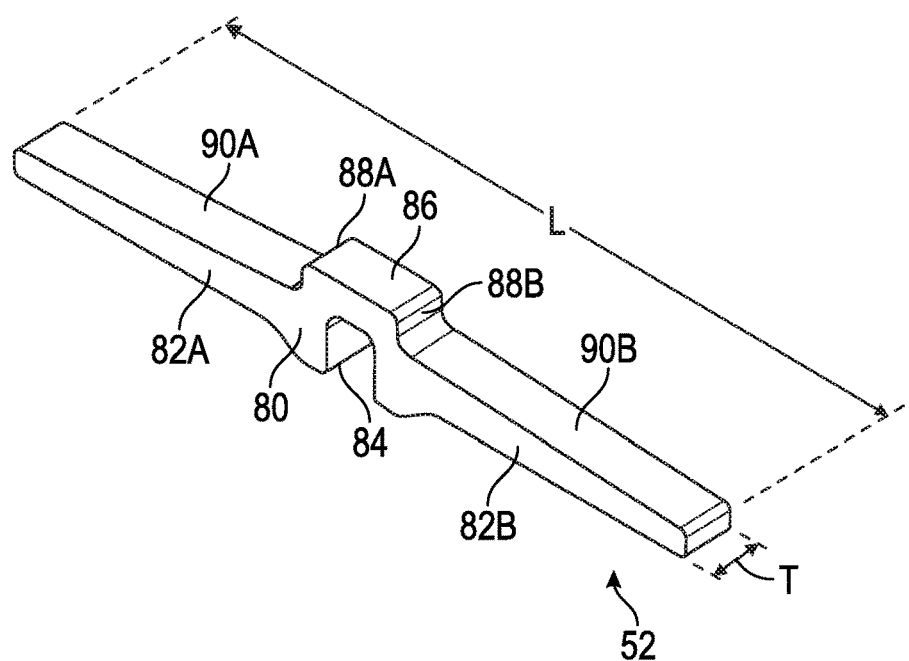
FIG. 6 is a perspective view of the locking key of FIGS. 5A and 5B showing arms extending laterally from a central portion.

FIG. 6 is a perspective view of locking key 52 of FIGS. 5A and 5B showing arms 82A and 82B extending laterally from central portion 80. Central portion 80 includes cut-out 84 and tab 86, which has sidewalls 88A and 88B. Arms 82A and 82B extend laterally from central portion 80 at sidewalls 88A and 88B, respectively. Arms 82A and 82B include outer surfaces 90A and 90B, respectively.

Central portion 80 comprises a generally rectilinear body having a lower portion disposed between arms 82A and 82B, and an upper portion defined by tab 86. In the embodiment of FIG. 6, cut-out 84 extends upward into an inner surface of central portion 80 towards tab 86. In one embodiment, locking key 52 has the same thickness T throughout its length L.

FIG. 7 is a front view of locking key 52 of FIGS. 5A and 5B showing circumferential curvature of arms 82A and 82B. In FIG. 7, locking key 52 is shown schematically in front of aft surfaces 64 of turbine blades 24 and aft surface 68 of rotor wheel 30, and below cut-away portions of hooks 74 of turbine blades 24 and hook 50 or rotor wheel 30 (See FIG. 2B). Tab 86 is disposed between ends 78A and 78B of lockwire 54, thereby serving as a circumferential stop for lockwire 54 that inhibits and, ultimately, prevents circumferential rotation of lockwire 54. Arms 82A and 82B extend generally laterally from central portion 80. However, outer surfaces 90A and 90B can be provided with a slight circumferential curvature to match the curvature of lockwire 54. Alternatively, outer surfaces 90A and 90B can be flat and angled slightly inward from tab 86 at angle A.

Figure 8A:
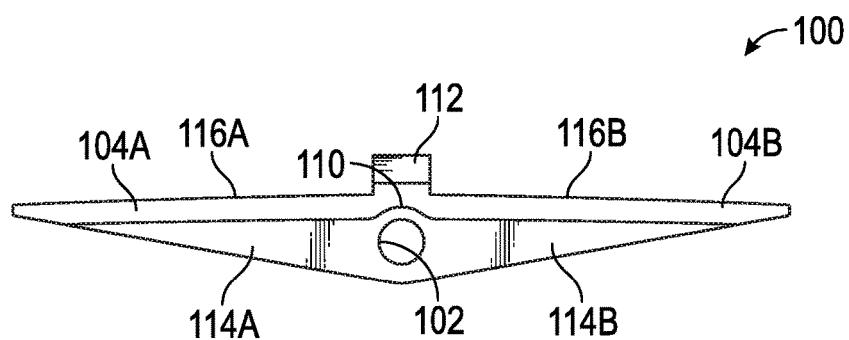
FIG. 8A is a front view of a second embodiment of the locking key of the present disclosure showing a through-hole for engaging a retention pin and aerodynamic wings for supporting the lockwire.
Figure 8B:
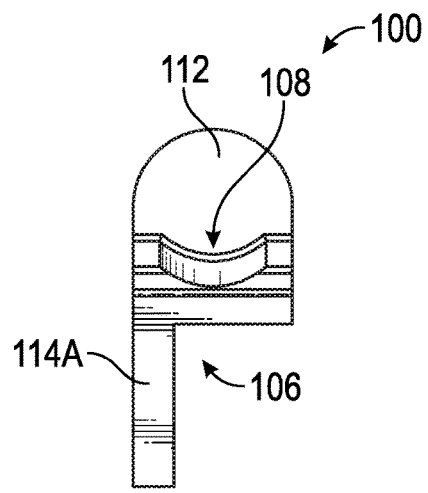
FIG. 8B is a side view of the locking key of FIG. 8A showing a cut-back to allow for grinding away of the retention pin and a saddle for engaging the lockwire.
Figure 8C:
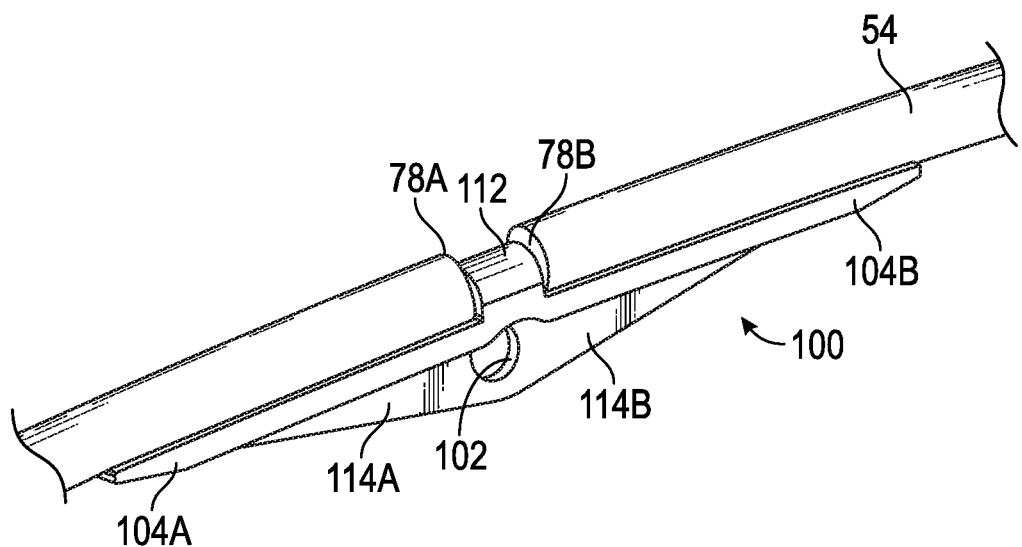
FIG. 8C is a perspective view of the locking key of FIGS. 8A and 8B disposed between ends of a lockwire.

FIG. 8A is a front view of locking key 100 of the present disclosure showing an aperture 102, such as a through hole, for engaging retention pin 56 and aerodynamic wings 104A and 104B for supporting lockwire 54. FIG. 8B is a side view of locking key 100 of FIG. 8A showing a saddle 108. FIG. 8C is a perspective view of locking key 100 of FIGS. 8A and 8B disposed between ends 78A and 78B of lockwire 54.

Locking key 100 also includes central portion 110 including tab 112, and supports 114A and 114B. Wings 104A and 104B include outer surfaces 116A and 116B, respectively, for supporting ends of lockwire 54. Tab 112 is sized to fit between the ends of lockwire 54. Tab 112 and wings 104A and 104B have the same thickness, as can be seen in FIG. 8B, which is approximately equal to the diameter of lockwire 54.

As can also be seen in FIG. 8B, supports 114A and 114B are not as thick as wings 104A and 104B, which allows for the formation of cut-back 106 that permits grinding away of retention pin 56. In particular, cut-back 106 provides a space between supports 114A and 114B and the aft-most portions of hook 50 (FIG. 2B) to permit a grinding tool to clearly access pin 56.

Wings 104A and 104B include saddles 108 for engaging lockwire 54. Saddles 108 provide a curved surface, or cup, for receiving ends 78A and 78B of lockwire 54 that can help guide ends 78A and 78B along wings 104A and 104B during the movements of lockwire 54 described with reference to FIGS. 5A and 5B.

Supports 114A and 114B each also have a V-shape that provides an aerodynamic shape to locking key 100 in both possible directions of rotation of rotor wheel 30. For example, supports 114A and 114B are small near their lateral tips, e.g. in the leading edge direction of rotation and grow in size or height near central portion 80 to push air out around locking key 100 during rotation. FIG. 8C also illustrates an embodiment where ends 78A and 78B of lockwire 54 contact or are in close proximity to tab 112.

Figure 9:
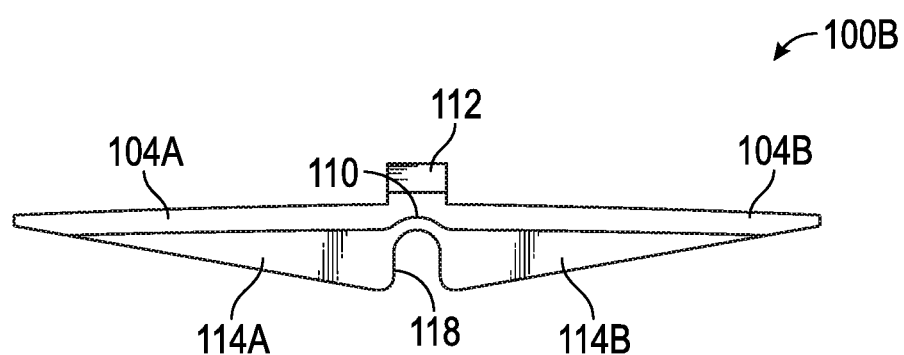
FIG. 9 is a front view of a third embodiment of the locking key of the present disclosure showing a slot for engaging a retention pin and aerodynamic wings for supporting the lockwire.

FIG. 9 is a front view of locking key 100B of the present disclosure showing a slot, or cut-out, 118 for engaging retention pin 56. Locking key 100B of FIG. 9 is substantially the same as locking key 100 of FIG. 8A, except that slot 118 replaces through-hole 106. Slot 118 provides similar linking of locking key 100B to rotor wheel 30 as locking key 100, but provides less radial restraint to locking key 100B to facilitate easier alignment with bore 75 and pin 56 to ease installation.

Locking key 52 can be installed using the following method. First, one of ends 78A and 78B of lockwire 54 can be inserted into slot 70 of hook 50 adjacent to bore 75 for pin 56. Lockwire 54 can then be pushed into slots 70 and 72 of blades 24 and posts 58, respectively, around the circumference of rotor wheel 30. Where ends 78A and 78B of lockwire 54 meet again on the opposite side of bore 75, lockwire 54 can be measured and marked so that there will be a gap between ends 78A and 78B equal to the width of tab 86. One of ends 78A and 78B can be partially removed and ground so that the gap between ends 78A and 78B matches, or is slightly larger than, the width of tab 86. Ends 78A and 78B can be reinserted into slots 70 and 72 to verify the gap length directly where pin 56 will be before inserting locking key 52 into the gap between ends 78A and 78B. Ends 78A and 78B will rest on arms 82A and 82B. Pin 56 can be inserted into bore 75 and cut-out 84 or another slot or through-bore. Locking keys 100 and 100B can be installed in a similar fashion.

In order to remove locking key 52, pin 56 is ground from the underside of hooks 50 and 74 within slots 70 and 72 (FIG. 2B). Grinding can be concentrated in the area of cut-out 84 in order to minimize the amount of material that is ground away (e.g., by minimizing grinding of portions of locking key 52). The remaining portion of pin 56 can be pushed or pulled out of bore 75 in any conventional manner, such as by pushing it through bore 75 with a punch tool. As mentioned, the thickness T of locking key 52 is such that locking key 52 can be loose enough to fall out of slots 70 and 72. Subsequently, lockwire 54 can be pulled out using wire removal slot 76 in blade 24. Lockwire 54 can be pulled out over the span of slots 70 and 72. Locking keys 100 and 100*b* can be removed in a similar fashion.

The locking keys of the present disclosure prevent circumferential rotation of the lockwire and additionally provide radial inner support to ends of the lockwire to prevent lockwire disengagement. The through-hole or slot in the locking key captures the pin used to restrain the lockwire to hold the locking key in place. The locking key can also include a tab extending from the outer diameter of the locking key to prevent the lockwire from rotating. Arms or wings of the locking key cradle the lockwire and extend long enough to account for changes in the geometry of the lockwire that can cause the gap between ends of the lockwire to grow. In various embodiments, the locking key can have only one wing or arm. The central tab provides a reference width for grinding the gap length between ends of the lockwire to ensure a snug installation fit. The locking key can include a cut-back portion to allow for grinding away of the retention pin and removal of the locking key. The locking key can be a one-time use part that that can be inexpensively replaced and installed without requiring modifications of the engine or lockwire. The locking key can be used with a counter-weight key on an opposite side of the rotor wheel to assist in balanced operation of the gas turbine engine.

Locking keys 52 and 100 of the present disclosure and the associated concepts described herein provide advantages to the operation of gas turbine engine 10. The concepts solve all understood rotation and wire retention issues. By capturing the retention pin, movement of the locking key is prevented during operation of the engine. The tab on the locking key prevents the lockwire from moving circumferentially. Support from circumferential or lateral extension of the arms or wings of the locking key secure ends of the lockwire in an outboard position, while simultaneously allowing for growth in the gap between ends of the lockwire. The locking keys described herein are inexpensive to manufacture and can be easily replaced, thereby reducing or eliminating modifications. The locking keys are easy to install and remove, such as without modification of the engine or locking key.

VARIOUS NOTES & EXAMPLES

Example 1 can include or use subject matter such as a gas turbine engine, such as can include or use: a rotor wheel comprising: a plurality of axial grooves extending through a periphery of the rotor wheel; and a plurality of posts formed between adjacent slots, each post having a circumferential slot; a plurality of blades mounted in the plurality of axial grooves of the rotor wheel, each blade having a circumferential slot circumferentially aligned with the circumferential slots of the plurality of posts; a lockwire extending across the plurality of axial grooves of the rotor wheel within each of the circumferential slots of the posts and the blades from a first end to a second end to inhibit axial displacement of the plurality of blades within the plurality of axial grooves; and a locking key disposed between the first and second ends of the lockwire to provide support to at least one of the ends of the lockwire to prevent the at least one end from being displaced radially inward.

Example 2 can include, or can optionally be combined with the subject matter of Example 1, to optionally include a locking key comprising a central portion positioned between the ends of the lockwire and for linking the locking key to the rotor wheel; and at least one arm extending laterally from the central portion restricting radially inward displacement of at least one of the first and second ends of the lockwire.

Example 3 can include, or can optionally be combined with the subject matter of one or any combination of Examples 1 or 2, to optionally include a locking key that includes a pair of arms extending in opposite lateral directions from the central portion to support each of the first and second ends of the lockwire, respectively.

Example 4 can include, or can optionally be combined with the subject matter of Example 3, to optionally include each arm having a saddle for receiving an end of the lockwire.

Example 5 can include, or can optionally be combined with the subject matter of one or any combination of Examples 3 or 4, to optionally include each arm has a height near the central portion that tapers toward a lateral end of each arm.

Example 6 can include, or can optionally be combined with the subject matter of one or any combination of Examples 3-5, to optionally include a central portion comprising a tab located between the first and second ends of the retention ring, the tab projecting radially beyond outer surfaces of the pair of arms to provide a circumferential stop.

Example 7 can include, or can optionally be combined with the subject matter of Example 6, to optionally include a tab having a width approximately equal to a distance between the first and second ends of the lockwire.

Example 8 can include, or can optionally be combined with the subject matter of one or any combination of Examples 6 or 7, to optionally include a distance between the first and second ends of the lockwire growing from a first gap length to a second gap length during operation of the gas turbine engine system, and wherein each of the arms of the pair of arms is longer than a difference between the second gap length and a width of the tab.

Example 9 can include, or can optionally be combined with the subject matter of one or any combination of Examples 2-8, to optionally include a fastener extending through a circumferential slot in one of the plurality of posts and extending through the central portion to link the locking key to the rotor wheel.

Example 10 can include, or can optionally be combined with the subject matter of one or any combination of Examples 2-9, to optionally include a central portion including a slot for receiving a fastener.

Example 11 can include, or can optionally be combined with the subject matter of one or any combination of Examples 1-10, to optionally include a counter-weight located on the rotor wheel one-hundred-eighty degrees from the locking key.

Example 12 can include or use subject matter such as a retention system for turbine blades in a gas turbine engine having a lockwire extending in a circular fashion from a first end to a second end such that a gap is present between the first and second ends, such as can include or use: a locking key comprising: a central portion for placement between the first and second ends of the lockwire to prevent circumferential rotation of the lockwire; and a pair of arms extending laterally from the central portion for providing radial support to the first and second ends of the lockwire.

Example 13 can include, or can optionally be combined with the subject matter of Example 12, to optionally include each arm having a saddle for receiving an end of the lockwire.

Example 14 can include, or can optionally be combined with the subject matter of one or any combination of Examples 12-13, to optionally include each arm having a height near the central portion that tapers toward a lateral end of each arm.

Example 15 can include, or can optionally be combined with the subject matter of one or any combination of Examples 12-14, to optionally include a pin for extending through the central portion of the locking key.

Example 16 can include or use subject matter such as a method of retaining a lockwire in a gas turbine engine system, such as can include or use: inserting a lockwire into a plurality of circumferential slots formed in a plurality of posts of a turbine wheel and a plurality of circumferential slots formed in a plurality of blade roots inserted between the plurality of posts; and inserting a locking key into a gap between ends of the lockwire, the locking key comprising arms extending therefrom, the pair of arms positioned radially inward of the ends of the lockwire.

Example 17 can include, or can optionally be combined with the subject matter of Example 16, to optionally include measuring the gap between the ends of the lockwire before inserting the locking key; and removing material from at least one end of the lockwire until the gap has a length approximately equal to a width of a tab on the locking key.

Example 18 can include, or can optionally be combined with the subject matter of one or any combination of Examples 16 or 17, to optionally include the lockwire being positioned such that an end of the lockwire is located adjacent a fastener bore in a post of the turbine wheel.

Example 19 can include, or can optionally be combined with the subject matter of one or any combination of Examples 16-18, to optionally include inserting a fastener through the locking key and into a fastener bore to secure the locking key to the turbine wheel.

Example 20 can include, or can optionally be combined with the subject matter of one or any combination of Examples 16-19, to optionally include expanding the lockwire such that a gap distance between ends of the lockwire increases over an arc; and sliding at least one end of the lockwire along one of the arms along an entire length of the arc of the gap distance.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:
1. A gas turbine engine system comprising:
   a rotor wheel comprising:
      a plurality of axial grooves extending through a periphery of the rotor wheel; and
      a plurality of posts formed between adjacent grooves, each post of the plurality of posts having a circumferential slot;
   a plurality of blades mounted in the plurality of axial grooves of the rotor wheel, each blade of the plurality of blades having a circumferential slot circumferentially aligned with the circumferential sots of the plurality of posts;
   a lockwire extending across the plurality of axial grooves of the rotor wheel within each of the circumferential slots of the posts of the plurality of posts and the blades of the plurality of blades from a first end to a second end to inhibit axial displacement of the plurality of blades within the plurality of axial grooves; and
   a locking key disposed between the first and second ends of the lockwire to provide support to at least one of the first and second ends of the lockwire to prevent the at least one of the first and second ends from being displaced radially inward without inhibiting radial outward displacement, the locking key comprising:

a central portion positioned between the ends of the lockwire and for linking the locking key to the rotor wheel; and at least one arm extending laterally from the central portion for positioning the at least one of the first and second ends of the lockwire against an underside of at least one of the circumferential slots of the plurality of posts and restricting radially inward displacement of the at least one of the first and second ends of the lockwire.

2. The gas turbine engine system of claim 1, wherein the locking key includes a pair of arms including the at least one arm extending in opposite lateral directions from the central portion to support each of the first and second ends of the lockwire, respectively.

3. The gas turbine engine system of claim 2, wherein each arm has a saddle for receiving an end of the lockwire, the saddles being open in a radially outward direction.

4. The gas turbine engine system of claim 2, wherein each arm has a height near the central portion that tapers toward a lateral end of each arm.

5. The gas turbine engine system of claim 2, wherein the central portion comprises a tab located between the first and second ends of the lockwire, the tab projecting radially beyond outer surfaces of the pair of arms to provide a circumferential stop.

6. The gas turbine engine system of claim 5, wherein the tab has a width [approximately] equal to a distance between the first and second ends of the lockwire.

7. The gas turbine engine system of claim 5, wherein a distance between the first and second ends of the lockwire grows from a first gap length to a second gap length during operation of the gas turbine engine system, and wherein each of the arms of the pair of arms is longer than a difference between the second gap length and a width of the tab.

8. The gas turbine engine system of claim 1, further comprising: a fastener extending through one of the circumferential slots in one of the plurality of posts and extending through the central portion to link the locking key to the rotor wheel.

9. The gas turbine engine system of claim 8, wherein the central portion includes a slot for receiving the fastener.

10. The gas turbine engine system of claim 1, further comprising a counter-weight located on the rotor wheel one-hundred-eighty degrees from the locking key.

11. A retention system for turbine blades in a gas turbine engine having a lockwire extending in a circular pathway from a first end to a second end such that a gap is present between the first and second ends, the retention system comprising:

a locking key comprising:
a central portion for placement between the first and second ends of the lockwire to prevent circumferential rotation of the lockwire; and
at least one arm extending laterally from the central portion for providing radial support to the first and second ends of the lockwire,
wherein the locking key prevents the first and second ends from being displaced radially inward without inhibiting radial outward displacement.

12. The retention system of claim 11, wherein each arm having a saddle for receiving an end of the lockwire.

13. The retention system of claim 11, wherein each arm has a height near the central portion that tapers toward a lateral end of each arm.

14. The retention system of claim 11, further comprising a pin for extending through the central portion of the locking key.

15. A method of retaining a lockwire in a gas turbine engine system, the method comprising:
inserting the lockwire into a plurality of circumferential slots formed in a plurality of posts of a turbine wheel and a plurality of circumferential slots formed in a plurality of blade roots inserted between the plurality of posts; and
inserting a locking key into a gap between ends of the lockwire, the locking key comprising at least one arm extending therefrom, the at least one arm positioned radially inward of the ends of the lockwire, wherein the locking key is inserted by sliding the locking, key radially upward into one of the plurality of circumferential slots to engage the at least one arm with the lockwire.

16. The method of claim 15, further comprising: measuring the gap between the ends of the lockwire before inserting the locking key; and removing material from at least one end of the lockwire until the gap has a length equal to a width of a tab on the locking key.

17. The method of claim 15, wherein the lockwire is positioned such that an end of the lockwire is located adjacent a fastener bore in a post of the plurality of posts of the turbine wheel.

18. The method of claim 17, further comprising inserting a fastener through the locking key and into the fastener bore to secure the locking key to the turbine wheel.

19. The method of claim 15, further comprising:
expanding the lockwire such that a gap distance between ends of the lockwire increases over an arc; and
sliding at least one end of the lockwire along one of the arms along an entire length of the arc of the gap distance.

* * * * *